US006963289B2

(12) United States Patent
Aljadeff et al.

(10) Patent No.: US 6,963,289 B2
(45) Date of Patent: Nov. 8, 2005

(54) WIRELESS LOCAL AREA NETWORK (WLAN) CHANNEL RADIO-FREQUENCY IDENTIFICATION (RFID) TAG SYSTEM AND METHOD THEREFOR

(75) Inventors: Daniel Aljadeff, Kiriat Ono (IL); Yair Granot, Modiin (IL); Shalom Tsruya, Rishon Lezion (IL); Reuven Amsalem, Nes-ziona (IL)

(73) Assignee: AeroScout, Ltd., Rehovot (IL)

( * ) Notice: Subject to any disclaimer, the term of this patent is extended or adjusted under 35 U.S.C. 154(b) by 257 days.

(21) Appl. No.: 10/274,698

(22) Filed: Oct. 18, 2002

(65) Prior Publication Data

US 2004/0078151 A1 Apr. 22, 2004

(51) Int. Cl.[7] ............................. G08B 5/22; H04Q 5/22; G01S 13/08
(52) U.S. Cl. ............................. 340/825.49; 340/10.33; 342/118
(58) Field of Search .................. 340/10.1, 10.3, 340/10.31, 10.4, 10.41, 10.42, 10.52, 573.1, 573.4, 539, 825.99; 342/357.07, 357.09, 118, 450

(56) References Cited

U.S. PATENT DOCUMENTS

| | | | | |
|---|---|---|---|---|
| 5,119,104 A | * | 6/1992 | Heller | 342/450 |
| 6,353,406 B1 | * | 3/2002 | Lanzl et al. | 342/118 |
| 6,424,264 B1 | * | 7/2002 | Giraldin et al. | 340/573.1 |
| 6,525,648 B1 | * | 2/2003 | Kubler et al. | 340/10.33 |
| 6,700,533 B1 | * | 3/2004 | Werb et al. | 342/357.07 |
| 2002/0086640 A1 | | 7/2002 | Belcher et al. | |
| 2002/0098852 A1 | | 7/2002 | Goren et al. | |

FOREIGN PATENT DOCUMENTS

WO    WO 01/61883 A2    8/2001

* cited by examiner

Primary Examiner—Michael Horabik
Assistant Examiner—Nam Nguyen
(74) Attorney, Agent, or Firm—A. Mitchell Harris; Weiss, Moy & Harris, P.C.

(57) ABSTRACT

A wireless local area network (WLAN) radio-frequency identification (RFID) tag system provides location finding in a wireless local area network (WLAN), using a WLAN channel. Interference with the WLAN is prevented by either using a sniffer circuit to determine that no network transmission is in progress, using a modified coding sequence or preamble to cause standard WLAN receivers to ignore the RFID tag transmissions, or transmitting a message using a standard WLAN signal addressed to an address not corresponding to a unit within the WLAN. Location units (LUs) and a master unit (MU) within the WLAN receive the RFID tag transmissions and can determine the location of a tag by triangulation based on differences between the signals received at the location units from the tag. The master unit receives the signal information from the location units and computes the location of the tag. Time-difference-of-Arrival (TDOA), received signal strength indication (RSSI) or other triangulation techniques may be used.

27 Claims, 3 Drawing Sheets

WIRELESS LOCAL AREA NETWORK (WLAN) CHANNEL RADIO-FREQUENCY IDENTIFICATION (RFID) TAG SYSTEM AND METHOD THEREFOR

CROSS-REFERENCE TO RELATED APPLICATIONS

The present application is related to previously-filed United States patent applications assigned to the same assignee: "METHOD AND APPARATUS FOR ENHANCING SECURITY IN A WIRELESS NETWORK USING DISTANCE MEASUREMENT TECHNIQUES", Ser. No. 10/156,244, filed May 24, 2002; "METHOD AND APPARATUS FOR INTRUSION MANAGEMENT IN A WIRELESS NETWORK USING PHYSICAL LOCATION DETERMINATION", Ser. No. 10/171,427, filed Jun. 13, 2002; and "METHOD AND SYSTEM FOR LOCATION FINDING IN A WIRELESS LOCAL AREA NETWORK", Ser. No. 10/225,267, filed Aug. 20, 2002. The specifications of the above-referenced U.S. patent applications are herein incorporated by reference.

BACKGROUND OF THE INVENTION

1. Field of the Invention

The present invention relates generally to wireless networks, and more specifically, to a radio-frequency identification tag and system for determining the physical location of tagged items.

2. Background of the Invention

Radio-frequency identification (RFID) tags are becoming widespread for locating items such as store inventory and corporate assets, as well as for employee locating via RFID badges. Locating stations are typically part of a dedicated wireless system for receiving tag signals from the RFID tags. Reception information is gathered from multiple location stations and the location of the RFID tags is determined at a central master station.

Wireless local area networks (WLANs) have also become widespread. WLANs according to the Institute of Electrical and Electronic Engineers (IEEE) specifications 802.11 (WLAN) (including 802.11a, 802.11b, etc.), 802.15.1 (WPAN) and 802.15.4 (WPAN-LR) provide wireless interconnection of computing devices and personal communications devices, as well as other devices such as home automation devices. Combinations of RFID tag systems and WLAN systems are available, but the RFID tags currently marketed use frequency bands and/or signaling mechanisms separate from the wireless local networks. The use of separate bands and/or signaling mechanisms requires substantial additional hardware in the locating stations for receiving signals that are intermittently transmitted from the tags at predetermined intervals. The additional hardware increases the cost and complexity of the locating stations.

Location finding within WLANs using signaling on a WLAN channel has been developed for WLAN units as described in the above-incorporated patent application: "METHOD AND SYSTEM FOR LOCATION FINDING IN A WIRELESS LOCAL AREA NETWORK". However, the complexity of a full WLAN unit including a network receiver, full MAC (Medium Access Control) support and interface is not justified for some applications in which a low-cost RFID tag is desirable. For example, employee badges and inventory tags do not require a full WLAN unit including a full receiver, transmitter and network support that generally will not be cost-justified for these applications.

Therefore, it would be desirable to provide an improved method and system for implementing RFID tag location finding in a wireless network, so that the physical location of tagged items may be determined by the wireless network without requiring substantial additional or special hardware in the locating stations or tags. It would also be desirable to provide such improved method and system without requiring the use of an additional frequency band. It would further be desirable to provide a wireless network including location units where both tags and standard units may be located by the same location units.

SUMMARY OF THE INVENTION

The above objective providing an improved RFID tag system that does not require substantial additional hardware and/or additional frequency bands for the locating stations is achieved in a method and system. The method is embodied in a system that determines a physical location of an RFID tag. The RFID tags include a transmit-only RF module with an optional sniffer circuit that can detect the presence of traffic without receiving and decoding the WLAN signals. A second option includes a sniffer circuit that can receive and decode WLAN signals. In a preferred embodiment, the RFID tags transmit in-band WLAN signals bearing a fictitious address that does not correspond to an address of a unit within the WLAN. The signals are transmitted periodically at predetermined intervals and avoid disrupting the operation of the WLAN by transmitting either after a sniffer circuit determines that no other transmissions are in progress or using a proprietary PN code sequence or preamble differing from standard WLAN signals. The location units and master station for receiving the above-described transmissions may be specially modified to receive the fictitious address and proprietary PN code sequence or preambles.

The foregoing and other objectives, features, and advantages of the invention will be apparent from the following, more particular, description of the preferred embodiment of the invention, as illustrated in the accompanying drawings.

DETAILED DESCRIPTION OF THE ILLUSTRATIVE EMBODIMENT

Figure 1:
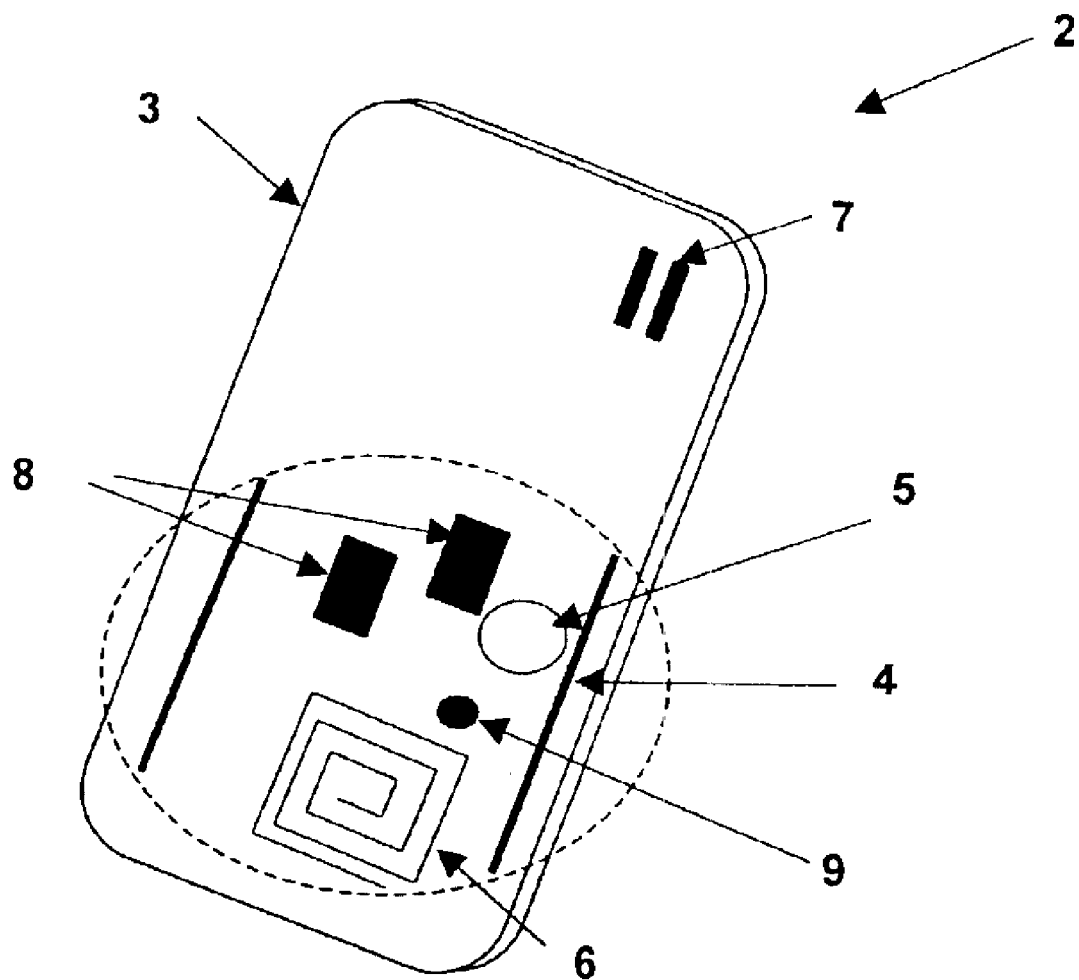
FIG. 1 is a pictorial diagram showing an RFID tag in accordance with an embodiment of the present invention.

Referring to the figures, and in particular to FIG. 1, a radio-frequency identification (RFID) tag 2, is depicted in accordance with an embodiment of the present invention. Tag 2 includes a printed circuit substrate 4 on which electronic components 8 are interconnected via conductive patterns on substrate 4 to form the tag circuits. The circuits generally comprise a transmitter for transmitting a signal on a wireless local area network (WLAN) channel, for reception by location units coupled to a WLAN. A battery 5 supplies power to the electronic circuit. An antenna 6 is coupled to the transmitter for launching the transmitted WLAN channel signal for reception by location units. Substrate 4 and electronic components 8 are covered with a housing 3, which may include surface decoration forming an identification badge, apertures through the housing for attachment to key rings or cords for using tag as a pendant, etc. A sensor 9 may be included within housing for measuring characteristics such as temperature, infrared signals, etc. and/or a connector 7 may be disposed on the outside of housing 3 for coupling an external sensor to the tag circuits.

Figure 2:
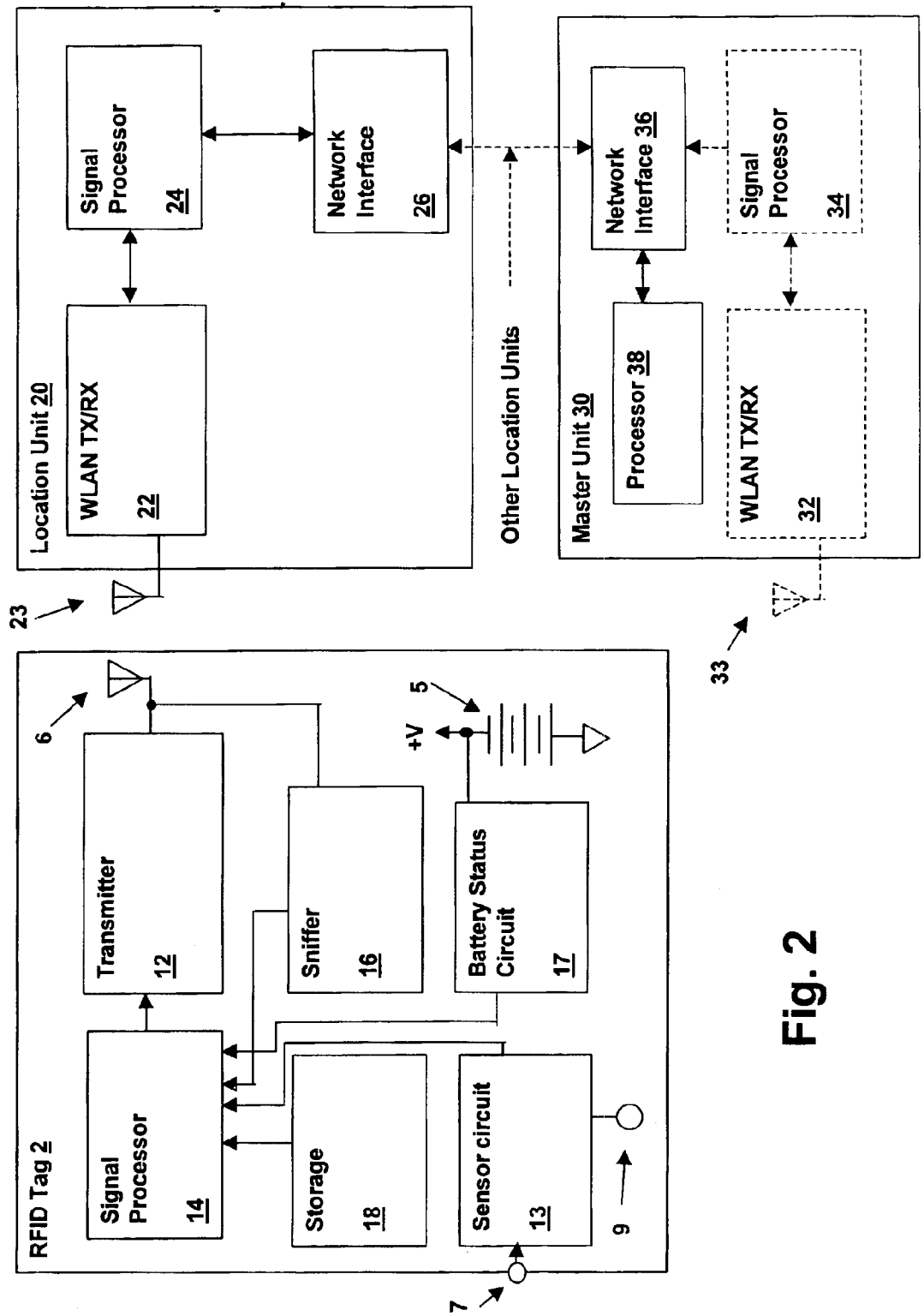
FIG. 2 is a block diagram depicting a wireless network in accordance with an embodiment of the present invention.

Referring now to FIG. 2, a WLAN in accordance with an embodiment of the present invention is depicted. RFID tag 2 includes a transmitter 12 that transmits a signal generated by a signal processor 14, on a channel of the WLAN, via antenna 6. The transmitted signal is transmitted periodically at predetermined intervals and includes an address not corresponding to a unit within the WLAN. The transmitted signal as a minimum includes an identification number associated with tag 2 that is retrieved from storage 18, which may also store signal processor 14 instructions and data. Tag 2 transmits at multiple frequencies in sequence, so that tag 2 may be located when tag 2 is moved through adjacent cells operating at different frequencies.

A sensor circuit 13 coupled to signal processor 14 may be included to receive signals from external sensor connector 7 or internal sensor 9 and a battery status monitoring circuit 17 may also be coupled to signal processor 14. Battery status circuit 17 and sensor circuit 13 provide information to signal processor 14 that may be transmitted along with the tag ID to the location units.

A sniffer circuit 16 is included to determine whether or not the WLAN channel is clear. If the WLAN channel is clear, the transmitted signal is transmitted at the predetermined time, otherwise a back-off algorithm as specified by the particular WLAN specification employed by the WLAN and the signal is transmitted subsequently when the channel is clear.

Alternatively, sniffer circuit 16 may be omitted, in which case the transmitted signal is differentiated from the standard WLAN signals by using a non-standard code sequence or a non-standard preamble. A longer code sequence may be employed rather than the 11-chip Barker code employed in IEEE 802.11 networks, so that the receiver correlators within standard network units will not be disrupted by the signal and only the location units will receive the signal. A longer preamble will cause the receiver frame decoders to ignore the transmitted signal, also avoiding disruption of the network, and a combination of any of the above techniques may be employed, including use of sniffer circuit 16 with a non-standard signal. Sniffer circuit 16 may be a signal amplitude detector (peak detector) or may include a correlator, a symbol matched filter and a message decoder. In a preferred embodiment, sniffer circuit 16 does not include a network interface, MAC packet formatter or message decoder, only what is necessary to determine whether or not the WLAN channel is in use. When optional sniffer circuit 16 is used, collisions between tag communications are avoided, thus improving the chance of receiving tag transmissions without errors. Battery life is improved by reducing the number of transmissions required.

At least three location units 20 are used in the present invention to determine the position of RFID tag 2 and one Master unit 30 is needed to compute the physical position of tag 2. Master unit 30 may include receiver circuits to serve as one of location units 20. Location unit 20 includes an antenna 23 coupled to a WLAN transmitter/receiver 22 for receiving WLAN signals, including signal from RFID tags 2 in accordance with embodiment of the present invention. WLAN transmitter/receiver 22 coupled to a signal processor 24 for decoding and extracting messages from received signals. If tags 2 transmit a non-standard preamble or code sequence, appropriate decoders and frame receivers are incorporated within signal processor 24 to receive the non-standard WLAN transmissions from tags 2. Signal processor 24 also determines the time-of-arrival of signal received from tags, for transmission to master unit 30 through a network interface 26, so that the position of tags 2 may be calculated. Network interface 26 may be a wired interface, but also may be wireless, in which case the connection to master unit 30 is made back through the transmitter portion of WLAN transmitter/receiver 22 and antenna 23.

Master unit 30 includes a processor 38 coupled to a network interface 36 that receives time-of-arrival information from location units 20 and calculates the position of tags 2 in conformity with the differences between times-of-arrival at location units 20. As mentioned above, master unit 30 may serve as one of location units 20 by including an antenna 33, a WLAN transmitter/receiver 32, and a signal processor 34 compatible with the tag 2 signals. If master unit 30 is also a location unit, then two other location units 20 must be employed to determine the position of tag 2. More than three receiving units may be employed to determine tag 2 location with a greater degree of certainty.

The present invention provides location finding of tags 2 in the presence of a wireless network, such as a WLAN (e.g., IEEE 802.11) or WPAN network, by calculating the time-difference-of-arrival (TDOA) for signals received from tags 2. Once the location of a tag is determined using the TDOA, the tag can be mapped in a network facility map, and property and personnel security can be managed in conformity with the tag location. In existing wireless network devices (generally the access points or "APs") may be enhanced to provide a TDOA measurement of tag without adding a separate infrastructure, thereby providing position determination and consequent enhanced network security with low incremental cost. Location units and master units (with appropriate modification if non-standard preambles or code sequences are transmitted by tags 2) in accordance with those described in the above-incorporated patent application "METHOD AND SYSTEM FOR LOCATION FINDING IN A WIRELESS LOCAL AREA NETWORK", may be used to detect the location of both tags 2 as well as mobile or stationary WLAN units.

Figure 3:
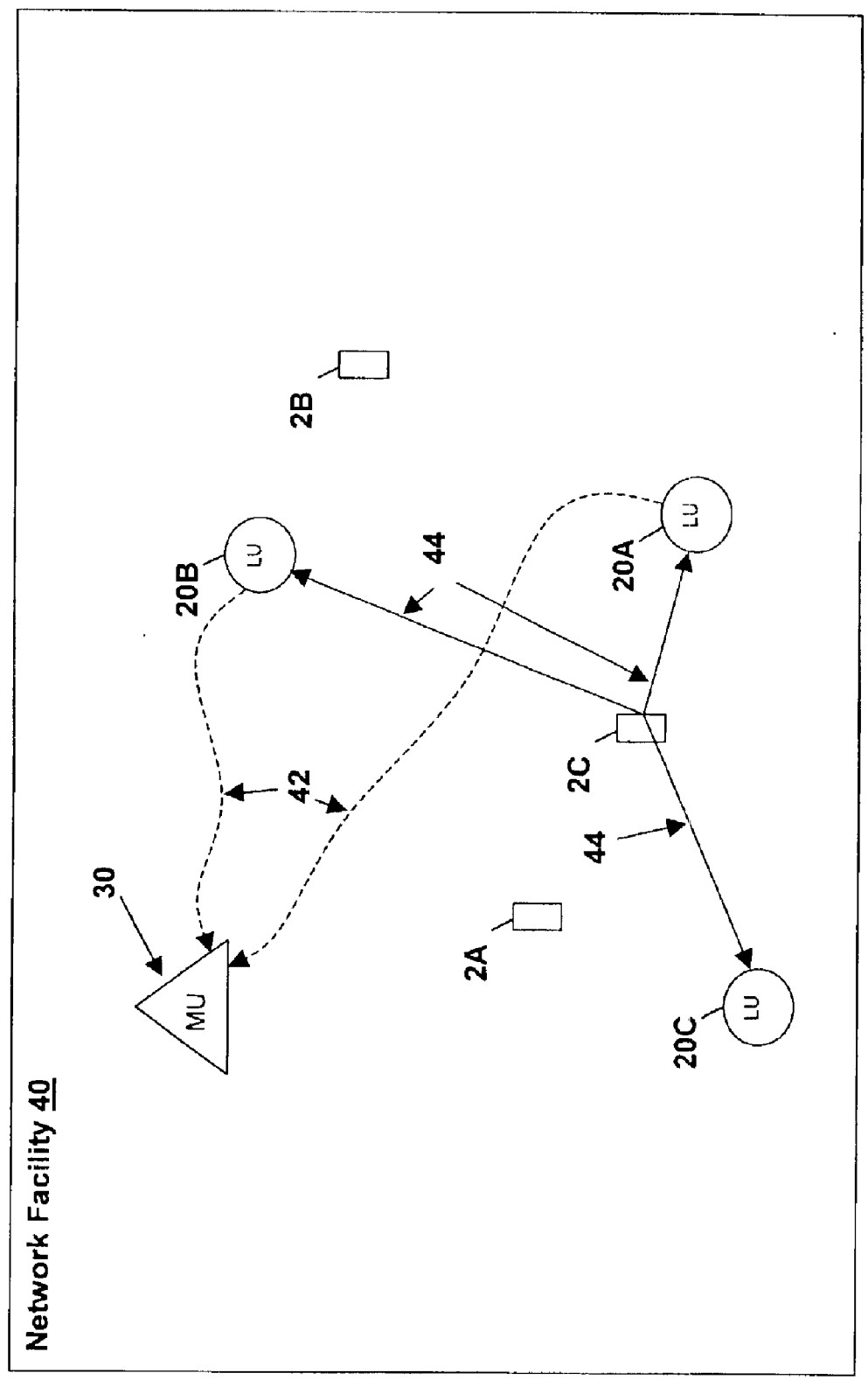
FIG. 3 is a pictorial diagram of a wireless network in accordance with an embodiment of the present invention.

In TDOA techniques, the location of a transmitting source can be determined by triangulation based on the timing between the signal arrivals at the multiple receivers. Referring now to FIG. 3, a wireless network is depicted in a pictorial diagram. Location units (LUs) 20A, 20B and 20C include time-of-arrival (TOA) electronics and software for measuring the arrival time of signals from tags 2A–2C. The time difference between reception of signal 44 (transmitted by tag 2C) by location unit 20A and reception of signal 44 by location unit 20B and 20C permits triangulation of the physical location of tag 2C. The time-of-arrival information of signal 44 as received by location units 20A, 20B and 20C are sent via network connections 42 (which may be the WLAN channel as mentioned above) and master unit 30, knowing the location of location units 20A, 20B and 20C and the times-of arrival of signals 44, computes the physical location of tag 2C.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for determining the location of an identification tag by a wireless local area network, said method comprising:

transmitting a signal from said identification tag on a channel of said wireless local area network, said signal bearing an identification number of said identification tag;

receiving said signal from said identification tag at multiple location units within said wireless local area network;

in response to said receiving, measuring a characteristic of said received signal at said multiple location units;

sending information corresponding to said measured characteristic from each of said corresponding multiple location units to a master unit; and determining, within said master unit, the location of said identification tag by using location information for said multiple location units in conjunction with said sent information to determine said location of said identification tag;

sniffing said channel via a sniffer circuit to determine whether or not said channel is clear;

in response to said sniffing determining that said channel is clear, performing said transmitting at said predetermined interval; and in response to said sniffing determining that said channel is not clear, transmitting said signal at a subsequent time when said channel is clear.

2. The method of claim 1, wherein said measuring determines multiple times of arrival of said received signal at each of said multiple location units, said sending sends said times of arrival from each of said corresponding multiple location units to a master unit, and wherein said determining determines said location by using location information for said multiple location units in conjunction with said multiple times of arrival.

3. The method of claim 1, wherein said measuring determines amplitude of said received signal at each of said multiple location unit, said sending sends said amplitude from each of said corresponding multiple location units to a master unit, and wherein said determining determines said location by using location information for said multiple location units in conjunction with said amplitudes.

4. The method of claim 1, wherein said transmitting transmits a signal on said channel bearing an address not corresponding to any unit of said wireless local area network, whereby standard receivers within said wireless area network ignore said signal.

5. The method of claim 1, wherein said sniffing comprises receiving messages from other units operating within said channel, and wherein said transmitting is performed in further response to said messages.

6. The method of claim 1, wherein said transmitting transmits a signals comprising a sequence of differing frequencies, whereby said tag may be located as it is moved through cells operating at said differing frequencies.

7. The method of claim 1, wherein said transmitting transmits a signal on said channel that has a code sequence differing from a code sequence used for ordinary data transmissions within said wireless local area network, whereby standard receivers within said wireless area network reject said signal.

8. The method of claim 1, wherein said transmitting transmits a signal on said channel that has a preamble longer than a preamble used for ordinary data transmissions within said wireless local area network, whereby standard receivers within said wireless area network reject said signal.

9. The method of claim 1, wherein said transmitting transmits a signal that further bears an indication of battery status of a battery within said identification tag.

10. The method of claim 1, wherein said transmitting transmits a signal that further bears information from a sensor coupled to a transmitter within said identification tag.

11. A wireless local area network (WLAN), comprising:

a plurality of identification tags for transmitting signals on a channel of said wireless local area network and bearing an identification number corresponding to a particular identification tag;

a plurality of location units for receiving said signals transmitted by said identification tags and determining a characteristic of said received signals on a channel of said wireless local area network; and at least one master unit for receiving information corresponding to said received characteristic from each of said location units, whereby locations of said identification tags are determined in conformity with said received characteristic, and wherein each of said identification tags comprise a sniffer circuit to determine whether or not said channel is clear, and wherein said wireless identification tags transmit said signals only when said included sniffer circuit determines that said channel is clear.

12. The wireless local area network of claim 11, wherein said characteristic is a time of arrival of said received signals, and wherein said master unit receives said times of arrival and determines said location in conformity with said times of arrival.

13. The wireless local area network of claim 11, wherein said characteristic is an amplitude of said received signals and wherein said master unit receives said amplitudes and determines said location in conformity with said amplitudes.

14. The wireless local area network of claim 11, wherein said identification tags each transmit a signal on said channel bearing an address not corresponding to any unit of said wireless local area network, whereby standard receivers within said wireless area network ignore said signal.

15. The wireless local area network of claim 11, wherein said sniffer circuit receives messages from other units operating within said channel, and wherein said transmitting is performed in further response to said messages.

16. The wireless local area network of claim 11, wherein said tags transmit a signal comprising a sequence of differing frequencies, whereby said tag may be located as it is moved through cells operating at said differing frequencies.

17. The wireless local area network of claim 11, wherein said identification tags transmit signals on said channel that have a code sequence differing from a code sequence used for ordinary data transmissions within said wireless local area network, and wherein said location units include receivers adapted to decode said longer code sequence, whereby said signals are received.

18. The wireless local area network of claim 11, wherein said identification tags transmit signals on said channel that have a preamble longer than a preamble used for ordinary data transmissions within said wireless local area network, and wherein said location units include receivers adapted to decode said longer preamble, whereby said signals are received.

19. The wireless local area network of claim 11, wherein said master unit is one of said location units.

20. A wireless identification tag for use within a wireless local area network (WLAN), comprising:

a storage for storing at least a identification number of said identification tag;

a transmitter coupled to said storage, for transmitting a signal from said identification tag on a channel of said wireless local area network, said signal bearing an identification number of said identification tag; and a sniffer circuit for determining whether or not said channel is clear, and wherein said transmitter transmits said signal in response to said sniffer circuit determining that said channel is clear.

21. The wireless identification tag of claim 20, wherein said transmitter transmits a signal on said channel bearing an address not corresponding to any unit of said wireless local area network, whereby standard receivers within said wireless area network ignore said signal.

22. The wireless identification tag of claim 20, wherein said transmitter delays transmission of said signal if said channel is not clear until a subsequent interval when said channel is clear.

23. The wireless identification tag of claim 20, wherein said transmitter transmits a signal on said channel that has a code sequence longer than a code sequence used for ordinary data transmissions within said wireless local area network, whereby standard receivers within said wireless area network reject said signal.

24. The wireless identification tag of claim 20, wherein said transmitter transmits a signal on said channel that has a preamble longer than a preamble used for ordinary data transmissions within said wireless local area network, whereby standard receivers within said wireless area network reject said signal.

25. The wireless identification tag of claim 20, wherein said identification tag further comprises:

a battery for supplying power to internal circuits of said identification tag; and a battery status monitor for monitoring a status of said battery, wherein said battery status monitor is coupled to said transmitter, and wherein said transmitter transmits an indication of said status within said signal.

26. The wireless identification tag of claim 20, wherein said transmitter further includes an input for receiving data from an external device, and wherein said transmitter transmits a signal that bears information from said external device coupled to a transmitter within said identification tag.

27. The wireless identification tag of claim 26, wherein said external device is a sensor.

* * * * *